July 6, 1948.  T. G. AITCHESON  2,444,485
CONTROL KNOB AND ASSOCIATED STRUCTURE
Filed Feb. 24, 1947
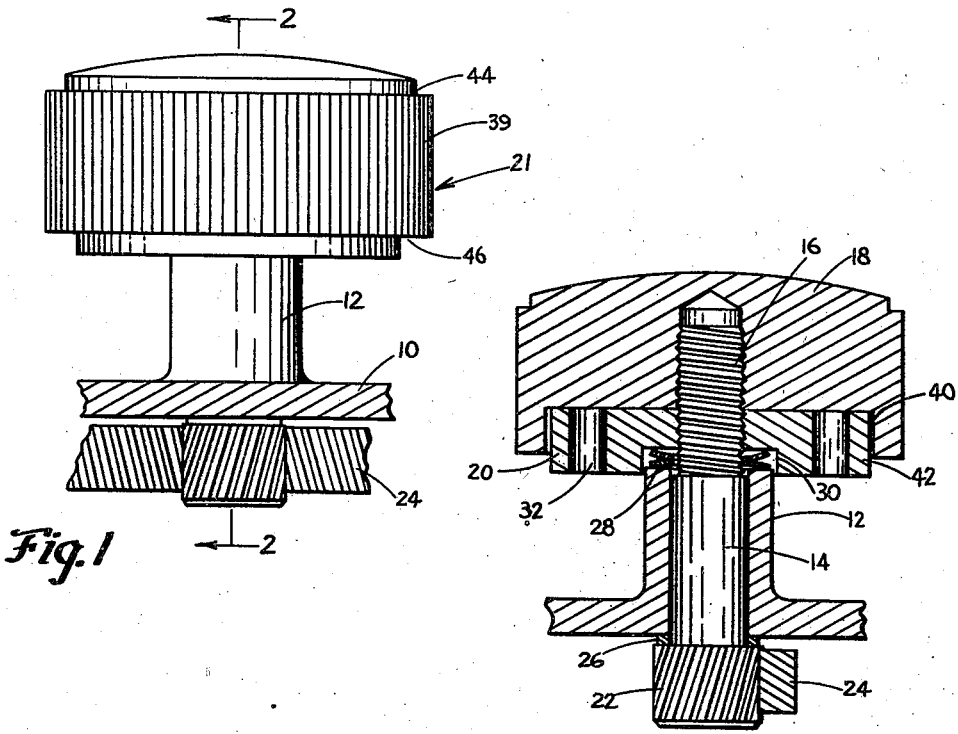
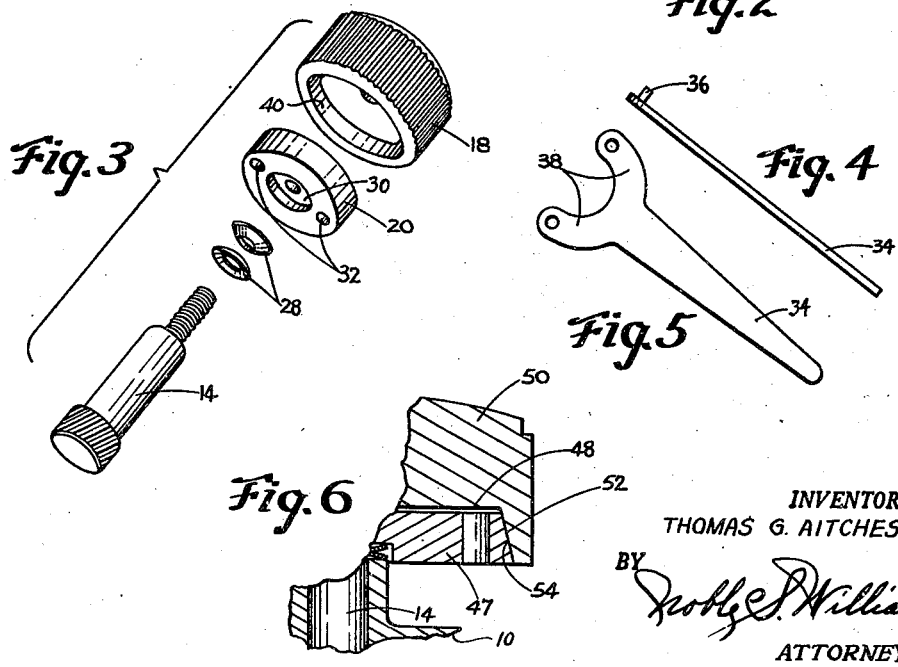
INVENTOR.
THOMAS G. AITCHESON
ATTORNEY Patented July 6, 1948

2,444,485

UNITED STATES PATENT OFFICE 2,444,485

CONTROL KNOB AND ASSOCIATED STRUCTURE

Thomas G. Aitcheson, Kenmore, N. Y., assignor to American Optical Company, Southbridge, Mass., a voluntary association of Massachusetts Application February 24, 1947, Serial No. 730,604

5 Claims. (Cl. 74—553)

This invention relates to manual control knobs and associated structure for use upon instruments and the like.

In various types of instruments and like devices provided with manual control means, it is often desirable to be able to assemble and accurately adjust the tension or friction on the control knobs of the instrument for proper operation from the front or outside of the instrument and desirable to be able to accomplish this in a simple and rapid manner. Furthermore, after the adjustment has been made the knobs and controls should be of such construction and outward appearance that they cannot be easily changed without a special tool and such that their manner of assembly and adjustment will not be readily apparent to persons using the instruments.

It is, accordingly, an object of the present invention to provide for use with instruments and devices of the types mentioned above control knobs which may be easily mounted, accurately adjusted to provide proper tension or friction for the instrument and may be readily locked in their adjusted positions. Furthermore it is an object of the invention to construct and arrange the control knob and associated structure in such a manner that it will not be readily apparent to the casual observer how or in what particular way the control knob assembly has been secured and locked in place. Accordingly, there will be less tendency to tamper with or disturb its adjustment.

It is a further object of the invention to provide in such a control knob assembly convenient and readily operable means for effecting fine adjustment of the friction on the operating shaft carrying the control knob assembly and to have said means concealed within parts of the assembly in such a manner as not to be visible and accordingly not apparent to the users of the instrument.

It is also an object of the invention to provide readily accessible locking means for the control knob assembly and which is in such a form that its presence will not be readily apparent to the casual observer, and to provide in such locking means apertures or the like which are not visible from the front of the instrument but which, nevertheless, may be easily engaged by a special tool for the adjustment of the associated friction means and for locking the assembly upon its supporting shaft.

Other objects and advantages of the invention will be readily apparent from the description which follows when considered in connection with the accompanying drawing in which:

Fig. 1 shows a side elevational view of a control knob assembly made in accordance with the present invention and arranged to operate associated structure;

Fig. 2 is a vertical sectional view taken substantially on line 2—2 of Fig. 1;

Fig. 3 is an exploded view showing the several parts of the control knob assembly of Fig. 2;

Figs. 4 and 5 are, respectively, side and plan views of a special tool which may be employed during the assembly and adjustment of the control knob of the invention; and Fig. 6 is a slightly modified form of the control knob assembly.

Referring to the drawings in detail, there is shown in Figs. 1 and 2 a conventional instrument panel or the like 10 upon which is formed a fixed outwardly projecting hollow boss 12 and within this boss a control or drive shaft 14 is rotatably positioned. Upon the outer end of the shaft 14 are provided screw threads 16 for receiving a threaded main body member 18 and a threaded auxiliary body member 20. These two body members together form a control knob assembly 21, which to the casual observer viewing the knob from a position outwardly of or above the panel 10 will appear as a single member. In the provision of such control knobs, it is often desirable to have the knobs spaced sufficiently from the panel 10, or the equivalent part of the instrument, so that the fingers of the operator will not encounter any interference while the knob is being rotated. The upstanding boss 12 is of such height as to effectively accomplish this result. While it will be apparent to the operator that the boss 12 remains stationary while the knob assembly 20 is being rotated, it will not be readily apparent to him that the control knob assembly can be easily and conveniently removed or adjusted from the front of the panel. The reason for this is that no joints, openings, projections, threads or rotating parts, other than the part 21 are visible from the front.

When a shaft such as shaft 14 is arranged to drive or operate a part of the instrument, it is desirable to adjust the amount of "play" or friction afforded by the shaft. In the present case a gear 22 or the like is shown integral with the inner end of the shaft 14 and is employed for driving a longitudinally shiftable rack 24. For this purpose the shaft 14 is provided with a bearing collar 26 arranged between the inner surface of the panel and the gear 22 and friction means in the form of two oppositely positioned dished spring washers or the like 28 are provided on the shaft 14 between the boss 12 and the body member 20 in such a manner that they may provide adjustable amounts of friction to the rotation of the shaft as is found desirable for the proper operation of the shaft. The auxiliary body member 20 is provided with a circular recess 30 concentric with the threaded opening therein and said recess 30 is of such a diameter and depth that it will readily receive the washers completely within the recess as well as the end portion of boss 12 over which it closely fits.

Also provided in the auxiliary member 20 are, as best shown in Fig. 3, a pair of diametrically opposed apertures 32 which are not ordinarily visible to the casual observer from a position in front of the instrument. However, these apertures may be conveniently engaged by a suitable tool, such as shown in small scale at 34 in Figs. 4 and 5, having outwardly projecting fingers 36 carried near the ends of spaced arms 38. The tool is of such formation that it will readily straddle the stationary boss 12 when its pins 36 are to be inserted into apertures 32. While it is obvious that a different number and arrangement of apertures might be provided in the auxiliary body member 20 if desired, two diametrically opposed apertures are preferred, particularly since without the proper tool both apertures cannot be conveniently engaged at the same time because of the stationary boss positioned therebetween.

The main body member 18 is provided preferably with knurling 39 on its periphery and has a circular recess 40 formed in its rear wall and concentric with respect to the threaded opening therein. The recess 40 is of such diameter that it will conveniently but closely receive the smooth outer periphery 42 of the member 20 and this recess is of such depth that it will receive and house at least a great part of the body member 20 therein. An annular groove 44 is shown in the body member 18 and is made of such size that it matches noticeably the annular groove 46 formed by the surface 42 and the adjacent rear wall portion of the member 18, thereby causing body members 18 and 20 to appear as a single member.

The mechanism just described may be readily adjusted to effect the proper tension or frictional drag on the shaft 14 according to the mechanism being operated. This is accomplished by threading the auxiliary member onto the end of the shaft and bringing it into engagement with the opposed washers engaging the end of boss 12, after which the main body member 18 is threaded onto the shaft 14 and into frictional or locking engagement with the auxiliary body member while this member is held from rotation by tool 34. Thereafter the knob assembly 21 may be turned to test the amount of resistance provided in the shaft and mechanism. If necessary, the body member 18 may then be backed off just enough to allow the auxiliary body member to be rotated into a firmer or a less firm engagement with the washers 28 while the shaft is prevented from rotating. It is a simple matter to again lock the knob assembly to the shaft and try the "feel" of the mechanism and, if necessary, to again readjust to obtain the exact frictional drag or resistance desired therefor.

Rotation of the member 20 during the above adjustments is easily effected by use of tool 34 slipped under the edge of the knob assembly and into engagement with the apertures 32. Since the outer periphery of member 20 is relatively large and easily gripped and provided on its periphery with knurling 39, it may be easily held or rotated by the hand of the operator. On the other hand, the member 20 with its smooth periphery 42 cannot be gripped without the aid of the proper tool. However, because of the outward appearance of the members 18 and 20, provided with the substantially similar grooves or shoulders at 44 and 46 which appear merely to be a part of the design of the control knob, it will not be readily apparent to the user of the device that at the shoulder 46 a separable joint between members 18 and 20 is provided.

In Fig. 6, there is shown a slight modification wherein auxiliary member 47 is made of such thickness that it is substantially completely housed within the recess 48 provided in the main body member 50. Nevertheless, the assembly of parts 47 and 50 may be accomplished in the same manner as that described above. In Fig. 6, instead of two flat opposed engagement surfaces as employed between members 18 and 20, there are provided sloping engagement surfaces 52 and 54 for effecting a frictional contact between parts 47 and 50 when their threaded portions are clamped or locked upon the threaded end of the shaft 14. In this connection, it should be noted, that any complementary annular surfaces within the recess in the main body member may be employed to set up the locking action desired between the body members and the shaft 14.

Having described my invention, I claim:

1. In a device of the character described having a support and a hollow fixed boss extending outwardly therefrom, the combination of a control shaft extending through said boss and rotatably carried therein and provided with a screw threaded outer end, a manual control knob assembly comprising a main body member and an auxiliary body member having central screw threaded openings for engagement with the threaded end of said shaft, said main body member being provided with a circular recess in its rear wall and arranged concentrically with respect to the threaded opening therein, the auxiliary body member having a peripheral surface of a slightly less diameter than the diameter of said recess, an engagement surface on said auxiliary body member arranged to engage a portion of said main body member within said recess, a circular recess in the rear wall of said auxiliary body member and of such diameter that it will freely receive and house the outer end portion of said fixed boss, whereby said auxiliary body member may be readily adjusted on said shaft to a position to enclose the end of said boss and then held while said main body member is threaded into firm engagement therewith for frictionally locking said members in operative position upon said shaft.

2. In a device of the character described having a support and a hollow fixed boss extending outwardly therefrom, the combination of a control shaft extending through said boss and rotatably carried therein and provided with a screw threaded outer end, a manual control knob assembly comprising a main body member and an auxiliary body member having central screw threaded openings for engagement with the threaded end of said shaft, said main body member being provided with a circular recess in its rear wall and arranged concentrically with respect to the threaded opening therein, the auxiliary body member having a peripheral surface of a slightly less diameter than the diameter of said recess, an engagement surface on said auxiliary body member arranged to engage a portion of said main body member within said recess, a circular recess in the rear wall of said auxiliary body member and of such diameter and depth that it will freely receive and house friction washer means encircling said shaft and the outer end portion of said fixed boss, whereby said auxiliary member may be readily adjusted to a position to enclose said washer means and the end of said shaft and then held while said main body member is threaded into firm engagement therewith for frictionally locking said members in operative position upon said shaft.

3. A manual control knob assembly adapted to be adjustably mounted and locked upon the threaded end portion of a rotatable instrument control shaft or the like, said assembly comprising a main body member having a screw threaded opening formed centrally therein and arranged to extend partially through said main body member from the rear thereof to a location adjacent but spaced inwardly of the front surface thereof, said main body member also being provided with a circular recess formed in the rear wall thereof and arranged concentrically with respect to the threaded opening therein, and an auxiliary body member having a threaded opening extending centrally therethrough and a peripheral surface arranged concentrically with respect to the threaded opening and of a diameter slightly less than the diameter of said recess, whereby a portion of said auxiliary body member may, when both members are threaded upon said shaft, extend into said recess, said main and auxiliary body members being provided with opposed engagement surfaces which will, when moved into firm engagement with each other within said recess, provide a frictional engagement between the threads on said members and on said shaft for locking said control knob assembly in adjusted position on said shaft.

4. A manual control knob assembly adapted to be adjustably mounted and locked upon the threaded end portion of a rotatable instrument control shaft or the like, said assembly comprising a main body member having a screw threaded opening formed centrally therein and arranged to extend partially through said main body member from the rear thereof to a location adjacent but spaced inwardly of the front surface thereof, said main body member also being provided with a circular recess formed in the rear wall thereof and arranged concentrically with respect to the threaded opening therein, and an auxiliary body member having a threaded opening extending centrally therethrough and a peripheral surface arranged concentrically with respect to the threaded opening and of a diameter slightly less than the diameter of said recess, whereby a portion of said auxiliary body member may, when both members are threaded upon said shaft, extend into said recess, said main and auxiliary body members being provided with opposed engagement surfaces which will, when moved into firm engagement with each other within said recess, provide a frictional engagement between the threads on said members and on said shaft for locking said control knob assembly in adjusted position on said shaft, and apertures formed in the rear wall of said auxiliary body member for engagement by a tool or the like for adjusting or locking of said control knob assembly upon said shaft.

5. In a device of the character described having an apertured supporting panel or the like, the combination of a rotatable control shaft extending outwardly through said aperture and provided with a screw threaded outer end, a manual control knob assembly carried upon the shaft and adapted to be secured in relatively close relation to said panel, said assembly comprising a main body member having a screw threaded opening formed centrally therein and extending partially through said main body member from the rear to a location adjacent the front surface thereof, said main body member also being provided with a circular recess formed in its rear wall and arranged concentrically with respect to said threaded opening, and an auxiliary body member having a threaded opening extending centrally therethrough and a peripheral surface arranged concentrically with respect to said last mentioned opening, said auxiliary member being of a diameter slightly less than the diameter of said recess so that a portion thereof may extend into said recess and provide when moved into firm engagement with a surface forming said recess a frictional engagement between the threads on said members and on said shaft for locking said assembly in adjusted position, and aperture means formed in the rear wall of said auxiliary body member for engagement by a relatively flat tool or the like when said control knob assembly is being adjusted or locked upon said shaft in close proximity to said supporting panel.

THOMAS G. AITCHESON.